United States Patent
Buchwald et al.

(10) Patent No.: US 6,547,860 B2
(45) Date of Patent: Apr. 15, 2003

(54) PROCESS FOR MANUFACTURE OF TRIBOELECTRICALLY CHARGED NONWOVENS

(75) Inventors: Holger Buchwald, Hemsbach (DE); Karl-Heinz Morweiser, Birkenau (DE); Klaus Veeser, Weinheim (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/990,072

(22) Filed: Nov. 21, 2001

(65) Prior Publication Data

US 2002/0121194 A1 Sep. 5, 2002

(30) Foreign Application Priority Data

Nov. 28, 2000 (DE) .......................... 100 59 050

(51) Int. Cl.$^7$ ................................. B03C 3/30
(52) U.S. Cl. ............... 96/17; 55/486; 55/528; 55/DIG. 2; 55/DIG. 5; 55/DIG. 39; 96/66; 96/69; 264/258; 264/DIG. 48; 442/403
(58) Field of Search ............. 96/17, 66, 69; 95/57, 59; 55/528, 486, DIG. 5, DIG. 39, DIG. 2; 264/257, 258, DIG. 8, DIG. 48; 442/402, 403, 408

(56) References Cited

U.S. PATENT DOCUMENTS

| | | | | |
|---|---|---|---|---|
| 2,612,966 A | * | 10/1952 | Nicol ........................... | 96/17 |
| 3,307,332 A | * | 3/1967 | Grace et al. .................. | 96/17 |
| 3,574,790 A | * | 4/1971 | Young et al. ................. | 525/207 |
| 4,917,942 A | * | 4/1990 | Winters ......................... | 96/99 |
| 5,419,953 A | * | 5/1995 | Chapman ..................... | 442/35 |
| 5,645,057 A | * | 7/1997 | Watt et al. ............. | 128/206.12 |
| 5,647,881 A | * | 7/1997 | Zhang et al. ................. | 55/382 |
| 5,709,735 A | * | 1/1998 | Midkiff et al. ................ | 96/17 |
| 5,792,242 A | * | 8/1998 | Haskett ......................... | 96/68 |
| 6,123,752 A | * | 9/2000 | Wu et al. ....................... | 96/69 |
| 6,171,369 B1 | * | 1/2001 | Schultink et al. ............. | 95/57 |
| 6,183,536 B1 | * | 2/2001 | Schultink et al. ............. | 95/57 |
| 6,428,610 B1 | * | 8/2002 | Tsai et al. ..................... | 96/15 |

FOREIGN PATENT DOCUMENTS

| | | |
|---|---|---|
| EP | 0 246 811 | 11/1992 |
| EP | 0 674 933 | 4/1998 |

* cited by examiner

*Primary Examiner*—Richard L. Chiesa
(74) *Attorney, Agent, or Firm*—Kenyon & Kenyon

(57) ABSTRACT

A process for the manufacture of a triboelectrically charged nonwoven, wherein a fiber blend made of polyacrylnitrile fibers with a titer of ≦1.7 dtex and of polyolefine fibers with a titer of ≦1.7 dtex is freed from lubricating agents and antistatic agents by washing, is dried down to a moisture content of <1% by weight and is carded on a longitudinal or randomizing card into a triboelectrically charged web with a mass per area unit of 15–80 g/m$^2$. This web is taken off by two simultaneously running rolls and a transfer roll, so that the web is laid on to a conveyor in machine direction, and bonded directly inside a bonding set, the unbonded web being forwarded via 1 to 3 points of transfer only.

15 Claims, No Drawings

PROCESS FOR MANUFACTURE OF TRIBOELECTRICALLY CHARGED NONWOVENS

BACKGROUND OF THE INVENTION

1. Field of the Invention

The invention involves a process for manufacture of a triboelectrically charged nonwoven material and its application.

2. Description of Related Art

Such filter media are composed of a fiber blend comprising at least two different fiber polymers, which are so different in the electro-negativity of their surface that they are provided with electrostatic charges during web manufacture through carding and through the subsequent bonding by means of a mechanical needle process. Such media have already been described in documents EP 0 246 811 and EP 0 674 933 and are widely used as so-called "triboelectrically charged electret filters" for aerosol filtration purposes.

In order to produce filter media on the basis of these processes, the fiber finish must be washed off the fibers prior to carding, and all the antistatically active constituents as wall as auxiliary agents, which normally ensure a good workability of the fibers on carding machines, must be removed.

However, this entails certain drawbacks like a significantly poorer workability of the washed fiber blend compared with standard fibers coated with fiber finish, and it has been impossible so far to produce "triboelectrically charged electret filters" on the basis of fine fibers (mean fiber titer $\leq 1.7$ dtex).

Problems arise particularly when the web is manufactured in accordance with document EP 0 246 811 using a carding engine. A comb, permitting to separate the web from the card and to transfer it on to a conveyor, is used as a card doffer system of the card cylinder. Although strong electrical charges are repeatedly released on the card doffer as a result of the combing mechanism, thus resulting in frequent failures of the fleece stacker plate, this technology has prevailed over the usual roll doffer system.

Web bonding has been performed by mechanical needling on the basis of the processes described so far. On webs exhibiting a higher mass per unit area, proper bonding is achieved by mechanical fiber interlacing, even if the needles leave unwanted channels, thus reducing the filtering efficiency of the nonwoven material.

With webs featuring a low mass per unit area, the needling technology is unable, however, to achieve proper bonding properties. If the mass per unit area falls below 100 g/m², the thin web will offer the needles only a weak resistance, and it will therefore be difficult to interface the fibers in such a way that they trigger a sufficiently high force flow of the fibers.

This is why the needling technology process can produce light "triboelectrically charged electret filters" (mass per unit area <50 g/m² only if it is reinforced by a carrier which will offer a sufficient resistance during the needling process of the loose web fibers.

Carrier materials are usually lightweight fabrics, scrims and nonwovens (preferably spunbonded nonwovens). Although these media only provide a negligible contribution to the filtration of fine aerosols, they are primarily used to establish a connection between the web and the carrier, and to meet the minimum requirements in terms of tensile strength for this nonwoven material.

The disadvantages inherent to the use of carriers are the costs involved as well as a poorer porosity of the filter media.

Even if lightweight webs can sufficiently be bonded by using a carrier material on the basis of the processes described here, the regularity of the web structure (fiber distribution) remains unsatisfactory. When using standard fiber blends of 2 to 3 dtex and applying cross-laying technology, the web already presents an open and uneven aspect as a result of the coarse fibers and matting technology applied because cross-laying technology causes the web to be deposited with a V-shape on to the feeding device leading to the bonding unit, and creates therefore corresponding nonhomogeneity inside the fleece. Moreover, the irregularities are intensified by the mechanical needling process, as the needles cause entire sections of the web to be shifted, thus forming larger perforations.

However, an irregular web structure is inappropriate for filter applications because an uneven fiber distribution or even perforations strongly affect the filtering efficiency.

The low density of lightweight triboelectrically charged nonwovens appeared to be a further drawback. In connection with heavy needlefelts, a density of 0.25 g/cm³ can be achieved only by means of mechanical needling. However, this value is strongly reduced if webs of less than 10 m/m² are bonded by means of needle technological means. In this case, the fibers will form large loops on both surfaces and produce voluminous nonwovens with a density of 0.03–0.07 g/cm³.

The low density of lightweight triboelectrically charged needlefelts poses no problems as long as they are used in a plane shape. Should they however be arranged inside filter components, a maximum of filtration area will have to be efficiently accommodated within a limited space. In such cases, voluminous media are at a serious disadvantage as compared with thinner products.

SUMMARY OF THE INVENTION

It is an object of the invention to provide a process for the manufacture of lightweight triboelectrically charged nonwovens and their applications.

These and other objects of the invention are achieved by drying a fiber blend consisting of polyacrylnitrile fibers with a titer of $\leq 1.7$ dtex and of polyolefine fibers with a titer of $\leq 1.7$ dtex, freed from lubricating and antistatic agents, down to a moisture content of <1% by weight, and by carding it into a triboelectrically charged web featuring a mass per unit area of 15–80 g/m² on a longitudinal or randomizing card. In this case, the web is taken off by two simultaneously running rolls and a transfer roll, thus causing the web to be deposited in machine direction on to a conveyor, and the bonding procedure takes place directly inside a bonding unit, the unbonded web being forwarded via 1 to 3 points of transfer only.

DETAILED DESCRIPTION OF THE INVENTION

The use of a longitudinal or randomizing card and the laying of the web in carding direction make it possible to prevent the fleece from being distorted in the cross lapper and the weight from fluctuating as a result of the V-shaped depositing plate.

The usual systems incorporating a comb or a doffer roll exhibiting a small diameter are not selected for separating the web from the carding engine, but a roll doffer system equipped with two simultaneously running rolls featuring a larger diameter (>200 mm), the first one acting as a compacting roll and the second one as a doffer roll, plus a fluted transfer roll. It is surprising to observe that this doffer system made it possible to card finely titered fiber blends with a high fleece regularity as well, and to place them on to the depositing belt.

In order to prevent the carded web from being elongated in machine direction after being laid down on the conveyor belt, it is necessary to opt for a short distance between the card and the bonding unit, and there must be only a minimum number of points of transfer between the card and the bonding unit. Ideally, a continuous conveyor belt should guide the web directly from the card to the bonding unit.

The best results are attained through bonding operations based on a water-jet needling process making it possible to bond lightweight and finely titered triboelectrically charged webs properly, without affecting significantly the structure of the web.

Benefits are also provided, as an alternative, by grid-shaped thermal bonding of the web by means of an ultrasonic calendering machine or by using heated calender rolls.

The bonding processes, water-jet needling procedures and thermal grid-shaped bonding operations involved in the present invention provide not only the benefit of preventing the destruction or perforation of the web as a result of the bonding process, but also the advantage of producing a more compacted nonwoven material.

Nonwovens manufactured in this way are thinner than equivalent mechanically needled products with the same mass per area unit, and they can therefore be mounted easily into filter components (in a pleated form, for example).

With regard to the grid-shaped thermal bonding process, preference is given to processes which will lead to a minimum compacting as well as minimum thermal stresses of the web. Grid-shaped bonding involving the ultrasonic calender engine is particularly suited for this purpose, but other types of grid-shaped bonding processes may be applied by means of heated calender rolls. In order to achieve the highest possible porosity, a bonding area ranging from 6% to 30% should be selected for the nonwoven to feature a minimum strength of 4 N for a 50 mm wide tearing strip, so as to meet the requirements involved in handling and use.

As a rule, it is not advisable for any type of bonding to meet the stringent strength and rigidity requirements by increasing the mass per area unit or the bonding area of the triboelectrical nonwoven material.

Greater benefits are brought by the use of blends incorporating polypropylene and polyethylene fibers or core sheath fibers as polyolefine fibers, the constituents with a lower melting point acting as binding fibers. Higher strength values are achieved through the use of fibers acting as binding fibers.

Greater benefits are also provided when laminating the triboelectrically charged nonwoven produced by the present invention together with other fabrics (like grid structures, fabrics, papers, nonwovens, etc.) triggering reinforcing effects.

One advantage of the triboelectrically charged nonwoven based on the present invention is the manufacture of a multilayer filter medium, the triboelectrically charged nonwoven being preceded by a prefiltering layer made of spunbonded or drylaid nonwoven material on the primary-air side, and followed by a fine-filter layer made of a microfiber fleece and/or filter paper on the clean-air side.

The arrangement of a highly porous filter layer at primary-air end makes it possible to prevent the layer made of triboelectrically charged fibers from being clogged at an early stage, and to extend the service life of the filter medium, which is manufactured with the triboelectrically charged nonwoven based on the present invention.

The nonwovens produced on the basis of this invention bring particularly valuable advantages in applications calling for a high filter efficiency within a limited space for installation of the filter component. Filter cassettes or cartridges incorporating zigzag-shaped pleated filter media are manufactured for small-size ambient-air purification appliances, such as car interior filters or engine intake-air filters, which provide filter-related advantages when using the lightweight triboelectrically charged microfiber nonwovens. Such nonwovens are laminated together with a reinforcing nonwoven, e.g. a plastic grid or a paper, to provide them with an appropriate rigidity for pleating purposes.

The nonwovens based on the present invention can also be successfully used as filter media for vacuum-cleaner bags. For such applications, they are produced as a laminated material together with filter papers, spunbonded nonwovens and/or microfiber nonwovens. The use of triboelectrically charged nonwovens as vacuum-cleaner bags provides the following benefits.

As highly efficient electret filters, they enhance significantly the filtering performance of customary filter media (especially filter papers). If triboelectrically charged nonwovens are arranged upstream of the paper layer in flow direction, they are also in a position to protect the paper layer against fine dust and, therefore, to improve the constancy of the vacuum-cleaner's suction performance. As laminated materials with papers, they can be pleated easily thanks to their low thickness, and processed into filter bags by means of inexpensive self-opening bag machinery.

Preferred embodiments of the invention are described in the following Examples 1 to 3:

EXAMPLE 1

A blend consisting of 60% of polyolefine bi-component fibers featuring a fiber fineness of 1.0 dtex and a staple length of 38 mm and 40% of polyacrylnitrile fibers of 40 mm/1.3 dtex fibers is formed; the fiber oiling and lubricating agents are then washed off the blend, and the fibers are dried again down to a residual moisture of <1 percent. A web featuring a mass per area unit of approx. 50 g/m$^2$ is formed by carding the fiber blend on a randomizing card and laid on to a takeover belt leading directly to the calender gap of a thermally heated calender, where the fleece is partially bonded using a punctiform engraving pattern (welded area of 14%). This filter medium exhibits a close distribution of the pores and, therefore, a good filter efficiency at a low mass per area unit. The mechanical strength values of the nonwoven are 10 N/50 mm (tearing strip) in machine direction and are sufficient for handling and use.

EXAMPLE 2

A blend consisting of 60% of polypropylene fibers of 1.7/40 mm, and 40% of polyacrylnitrile fibers of 1.7 dtex and 40 mm is formed; the fiber oiling and lubricating agents are then washed off the blend, and the fibers are dried again down to a residual moisture of <1 percent. A web of approx. 50 g/m$^2$ is formed out of this fiber blend on a randomizing card, laid on to a takeover belt, and both layers are then directed into the calender gap of a thermally heated calender, following the introduction of an extruded polypropylene grid having a weight of 11.5 g/m², where the fleece is partially bonded using a punctiform engraving pattern and laminated, at the same time, with the polypropylene grid. The finished laminated material exhibits a uniform web structure with a mass per area unit of 60 g/m².

EXAMPLE 3

A web with a weight of approx. 35 g/m² is produced on the basis of the manufacturing process specified in Example 2, brought together with an extruded polypropylene grid featuring a weight of 11.5 g/m², thus producing after completion of the bonding process a nonwoven laminated material with a mass per area unit of 46 g/m². The latter is equally characterized by a good fiber distribution.

COMPARATIVE EXAMPLE

The comparative example is based on a blend made of 60% of polyolefine bi-component fibers of 1.7 dtex, 40 mm, and 40% of polyacrylnitrile fibers of 1.7 dtex, 40 mm, in accordance with the production process traditionally applied so far. The fiber blend is mixed, washed and dried, as specified in Example 1. The fiber is then carded on a carding engine, the fleece thus formed is taken off the drum by means of a comb and brought over to a cross lapper which, in turn, lays the web down on a belt. A polyester spunbonded nonwoven with a mass per area unit of 30 g/m² is added, upstream of the needle loom, to the fleece layer featuring a weight of 40 g/m². Mechanical needling of both layers produces a nonwoven material with a mass per area unit of 70 g/m², which presents adequate mechanical strength values. The pattern shows a foggy and irregular web structure.

The technical values applying to these examples as well as a further comparative sample customary in trade are summed up in Table 1.

been separated by the filter medium involved. The difference in pressure, expressed in Pascal (Pa), is the static pressure drop through the filter medium as compared with the volume flow of 0.08 m/s.

Regularity of the web structure

An optoelectric measuring process was applied for measuring the regularity of the web structure. The regularity is expressed by the web structure index; the more the web structure becomes irregular and foggy, the higher this index. Values of <3.5 are achieved in connection with this index on nonwovens featuring a very good distribution of fibers.

Quotient L: ($D_{NaCl}D$)

The quality of a filter is determined essentially by the porosity and filtering efficiency. The objective is to cut off avtive aerosols as far as possible at a high porosity (measured as air permeability L). In other words, a minimum of aerosols should penetrate the filter (measured as degree of permeability $D_{NaCl}$). In order to assess products featuring different porosity values, the quotient is formed by the air permeability value and the degree of permeability to sodium chloride. High quotient L: $D_{NaCl}$ values are achieved by filters exhibiting high arrestance values and good porosity. If a low filter medium thickness (D) is involved, it is possible to accommodate a larger efficient filter area within a certain building space. The L: $D_{NaCl}$, index has been supplemented by the thickness value, so as to assess the benefits provided by thin media inside filter cartridges, cassettes, etc.

What is claimed is:

1. A process for the production of a triboelectrically charged nonwoven material, comprising: washing a fiber blend made of polyacrylnitrile fibers with a titer of ≦1.7 dtex and of polyolefine fibers with a titer of ≦1.7 dtex so as to remove lubricating and antistatic agents, drying the blend down to a moisture content of <1% by weight, carding the blend on a longitudinal or randomizing card into a triboelec-

TABLE 1

| Pattern Qty to be measured | Mass per area unit g/m² | Thickness Mm | Air permeability l/m² | Degree of permeability % | Quotient L:($D_{NaCl}D$) | Web structure index |
|---|---|---|---|---|---|---|
| Example 1 | 53 | 0.55 | 1800 | 5.2 | 629 | — |
| Example 2 | 60 | 0.70 | 2150 | 10.4 | 294 | 3.2 |
| Example 3 | 46 | 0.55 | 2560 | 12.5 | 373 | 4.9 |
| Comparative example 1 | 70 | 1.20 | 2900 | 15.0 | 160 | 9.4 |
| Comparative example 2 (customary in trade) | 40 | 0.56 | 4600 | 45.0 | 182 | — |

Testing methods

Thickness

Area to be measured 10 cm², measuring pressure 12.5 cN/cm², loading time 1 sec.

Air permeability

DIN 53 887 measusred at 200 Pa (area of 20 cm²)

Degree of permeability to sodium chloride

The degree of permeability to sodium chloride is measured with the "TSI Certitest Model 8130" instrument. The TSI 8118 Model was used as an aerosol generator for common salt; sodium chloride particles were produced with a mean diameter of 0.26 μm (mass). The measurement were performed at a filtration speed of 0.08 m/s.

The degree of permeability to NaCl is the measure for the passage of the sodium chloride aerosols, which have not trically charged web with a mass per area unit of 15–80 g/m², transferring the web on to a conveyor in machine direction, and bonding directly inside a bonding set, wherein the unbonded web is forwarded via 1 to 3 points of transfer.

2. The process according to claim 1, wherein the web is transferred from the card by two simultaneously running rolls and a transfer roll whereby the web is laid on to the conveyor.

3. The process according to claim 1, wherein the bonding is performed by water-jet needling.

4. The process according to claim 2, wherein the bonding is performed by water-jet needling.

5. The process according to claim 1, wherein the bonding is performed by thermal bonding involving a print bonding roll inside an ultrasonic or a thermal calender.

6. The process according to claim 2, wherein the bonding is performed by thermal bonding involving a print bonding roll inside an ultrasonic or a thermal calender.

7. The process according to claim 5, wherein the polyolefine fibers are a blend of polypropylene and polyethylene fibers or core-sheath fibers, wherein the constituents with a lower melting point act as binding fibers.

8. The process according to claim 6, wherein the polyolefine fibers are a blend of polypropylene and polyethylene fibers or core-sheath fibers, wherein the constituents with a lower melting point act as binding fibers.

9. A triboelectrically charged nonwoven material produced according to the process of claim 1 which exhibits a regular fiber distribution, a uniform binding expressed by a web structure index of $\leq 5$, a density of $\geq 0.07$ g/cm$^3$ and a filtering performance expressed by the quotients L: $(D_{NaCl}D)>200$.

10. A triboelectrically charged nonwoven material produced according to the process of claim 2 which exhibits a regular fiber distribution, a uniform binding expressed by a web structure index of $\leq 5$, a density of $\geq 0.07$ g/cm$^3$ and a filtering performance expressed by the quotients L: $(D_{NaCl}D)>200$.

11. A triboelectrically charged nonwoven material produced according to the process of claim 3 which exhibits a regular fiber distribution, a uniform binding expressed by a web structure index of $\leq 5$ a density of $\geq 0.07$ g/cm$^3$ and a filtering performance expressed by the quotients L: $(D_{NaCl}D)>200$.

12. A triboelectrically charged nonwoven material produced according to the process of claim 5 which exhibits a regular fiber distribution, a uniform binding expressed by a web structure index of $\leq 5$, a density of $\geq 0.07$ g/cm$^{-3}$ and a filtering performance expressed by the quotients L: $(D_{NaCl}D)>200$.

13. A triboelectrically charged nonwoven material produced according to the process of claim 7 which exhibits a regular fiber distribution, a uniform binding expressed by a web structure index of $\leq 5$, a density of $\geq 0.07$ g/cm$^3$ and a filtering performance expressed by the quotients L: $(D_{NaCl}D)>200$.

14. A multilayer filter medium comprising a triboelectrically charged nonwoven material according to claim 9 as an active constituent of a laminated material and a fabric.

15. A multilayer filter medium comprising a triboelectrically charged nonwoven material according to claim 9, the triboelectrically charged nonwoven being preceded by a prefilter layer, spunbonded nonwoven or drylaid nonwoven on the primary air side, and followed by a fine filter layer made of a microfiber fleece or filter paper on the clean air side.

* * * * *